United States Patent [19]

Davis

[11] 4,059,035
[45] Nov. 22, 1977

[54] APPARATUS FOR CUTTING PIPE INSULATION

[76] Inventor: William Lawrence Davis, 1166 Tara Blvd., Baton Rouge, La. 70806

[21] Appl. No.: 713,528

[22] Filed: Aug. 11, 1976

Related U.S. Application Data

[63] Continuation-in-part of Ser. No. 643,903, Dec. 23, 1975, abandoned, which is a continuation-in-part of Ser. No. 512,365, Oct. 4, 1974, abandoned.

[51] Int. Cl.² .................. B23D 57/00; B26D 1/34; B26D 3/00; B27B 19/00
[52] U.S. Cl. .................................. 83/1; 83/5; 83/768
[58] Field of Search ........................ 83/1, 5, 768

[56] References Cited

U.S. PATENT DOCUMENTS

| 18,960 | 12/1857 | Davis | 83/768 |
| 2,565,400 | 8/1951 | Skeoch | 83/5 |
| 3,491,631 | 1/1970 | Skinner | 83/5 |
| 3,518,906 | 7/1970 | Albrektson | 83/1 |

Primary Examiner—Donald R. Schran
Attorney, Agent, or Firm—Roy, Kiesel, Patterson, Hudson & Abadie

[57] ABSTRACT

An apparatus for making semi-circular pipe insulation segments from a block of foamed glass or like foamed, expanded or cellular plastics or elastomers comprising reciprocating adjustable cutter members mounted on a reciprocating frame structure which cutter member travels in an arcuate path through the block placed below the cutter members.

3 Claims, 16 Drawing Figures

APPARATUS FOR CUTTING PIPE INSULATION

RELATED APPLICATIONS

This is a continuation-in-part of U.S. Patent application Ser. No. 643,903 and now abandoned entitled "Apparatus for Cutting Pipe Insulation" filed Dec. 23, 1975 by the inventor herein, which application is a continuation-in-part of U.S. Patent application Ser. No. 512,365 entitled "Apparatus for Making Insulation Pipe Coverings" filed Oct. 4, 1974, now abandoned. It is intended that for purposes of obtaining benefits of these earlier filing dates that all material and disclosures in those prior applications be made part of this application.

BACKGROUND OF THE INVENTION

1. Field of the Invention

This invention relates broadly to devices for cutting foamed glass or like material and more particularly for cutting semi-circular insulation segments from foamed glass or like material.

2. Prior Art

Conduits adapted to convey thermal material are usually covered with a layer or layers of a proper insulation material so as to avoid as much or possible transfer of heat or cold from the conduit to the surrounding atmosphere. One such type of insulation which, when applied to the exterior of the conduit and held thereon by means of suitable clamp members form a very effective insulation for the conduit. Conduit to be thus insulated come in a variety of outside diameters and thus it is desirable that a means be provided to cut the half sections with varying inside and outside diameters in order to permit for the insulation sections to be of such inside diameter as to snugly engage the conduit to thus provide an effective insulation therefor.

These problems encountered in cutting the insulation material has been the amount of waste material produced, the large amounts of foamed glass dust that is thrown into the atmosphere around the cutting of the necessary semi-circular segments.

SUMMARY OF THE INVENTION

Therefore, one object of the invention is to provide an apparatus capable of cutting from a block of insulation material such as foamed glass or the like, half circle segments of the desired inside and outside diameters, which, when applied to a conduit and secured thereto will provide an effective insulation for the conduit.

Another object of the invention is to provide a stationary frame member having mounted therein a reciprocating saw carrying frame with means whereby the same may be reciprocated and simultaneously rotated in an arcuate path of 180° to thus carve out of a block of insulation material a segment or section having the desired inside and outside diameter so that when the segments are applied to the exterior of a conduit they will serve as an effective insulation for the conduit.

Another object of the invention is to provide a simple means whereby the saws employed for cutting the half-circle segments may be easily adjusted to thus cut segments of varying thicknesses as well as varying inside and outside diameters for the segments.

Another object of the invention is to provide a power means at one side of a reciprocating saw carrying frame to impart a reciprocating motion thereto.

Another object of the invention is to provide an endless carrier supported on a suitable framework whereby uncut blocks of insulating material may be brought to a position where they will be engaged with the reciprocating and rotating saws to cut the desired half-circle segment therefrom and following the cutting operation the endless carrier will convey the half-circle segments to a position where they can be removed from thereon.

Another object of the invention is to provide a simple means whereby the endless conveyor is supported on a horizontally estending frame structure which is supported by means of struts extending therefrom and secured to centrally located vertically extending support columns.

Another object of the invention is to provide an apparatus which will cut from a block of insulating material segments having varying inside and outside diameters with a minimum of waste of the block material and without imparting into the surrounding atmosphere during the cutting operation undesirable dust particles thus avoiding pulluting the atmosphere.

Another object of this invention is to provide a cutting blade structure to insure accurate cutting of the foamed glass or like material.

Another object of this invention is to provide a fastening assembly for quick and firm engagement of the block when in position for cutting.

Other objects and advantages of the invention will be readily ascertained by referring to the following description and illustration shown in the drawings.

Accordingly, an apparatus for cutting semi-circular segments of insulation material from a block of insulation material is provided comprising a stationary vertically extending framework including pairs of spaced apart supports, means for supporting the block in a fixed position between the supports, a reciprocating framework mounted for movement between the pairs of spaced apart supports, a saw assembly mounted for movement with the reciprocating framework, a second means for rotating the saw assembly to cut semi-circular segments from the block when the framework is reciprocated.

PREFERRED EMBODIMENTS OF THE INVENTION

Referring now to the drawings wherein like reference numerals are employed to designate like parts throughout the various view thereof, numeral 10 designates in general the structure of the present invention. Looking in particular at FIGS. 1 and 2, apparatus 10 comprises a stationary vertically extending framework 11, conveyor belt assembly 12 for supporting the block 13 of insulation material in a fixed position between channel iron 14, a reciprocating framework 15 mounted for movement between the pairs of spaced apart channel irons 14, a saw assembly 16 mounted for movement with framework 15, and a second means 17 for rotating the saw assembly to cut semi-circular segments from block 13 when framework 15 is reciprocated.

Vertically extending upright channel irons 18 and 19 extend on each side of the cutting assembly 16 and are connected at their lower ends, as by welding or otherwise to a transversely extending beam 20, also of channel iron. When using the term channel iron in the description of the invention, it will be understood the same comprises generally U-shaped members having a bottom and upstanding walls and such structures are well known in the art.

Uprights 18 and 19 are mounted for reciprocating movement between stationary framework 11 in a manner to be more fully described hereinafter. Stationary framework comprises a pair of spaced apart vertically extending standards 14, one such pair extending on each side of the cutting assembly 16, and such standards are secured, as by welding, or otherwise, to horizontally extending channel irons 21, 22 which are either ground or floor supported. Extending from the horizontal channel irons 21, 22 are diagonally disposed braces 23 which are secured as by welding or otherwise to both the horizontal irons 21, 22 and to vertical standards 14 to add rigidity to the said standards 14 as shown.

Figure 2:
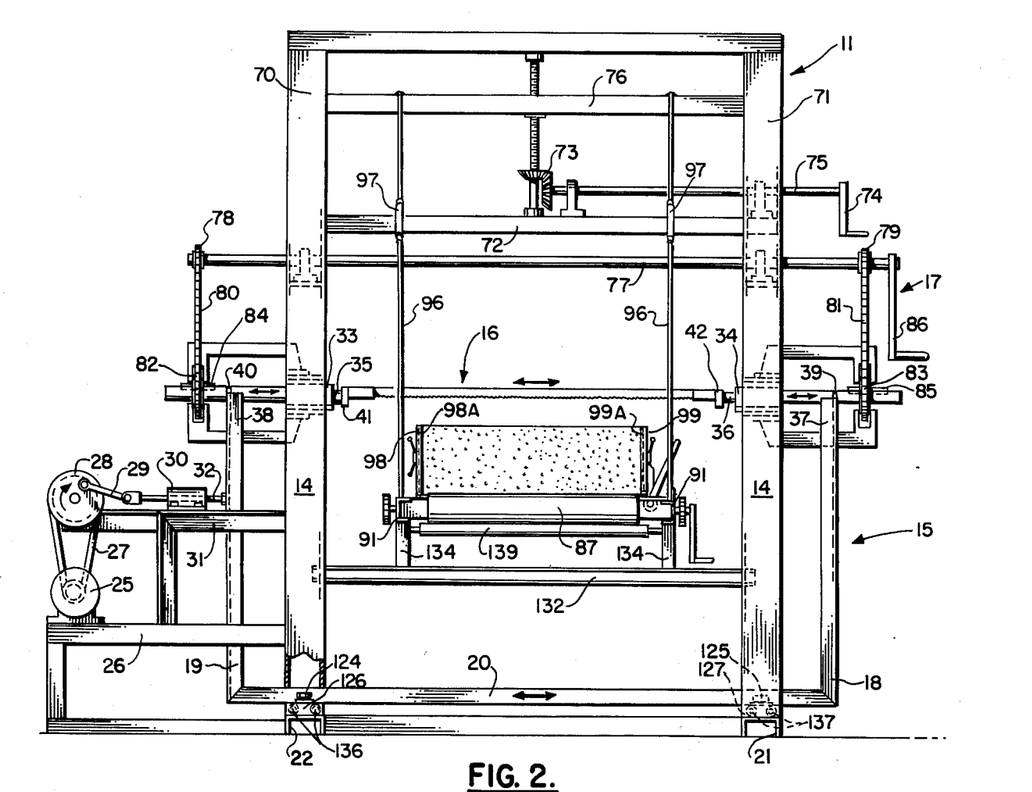
FIG. 2 is an end view taken along lines 2 — 2 of FIG. 1 showing the saw assembly mounted on the reciprocating framework.
Figure 3:
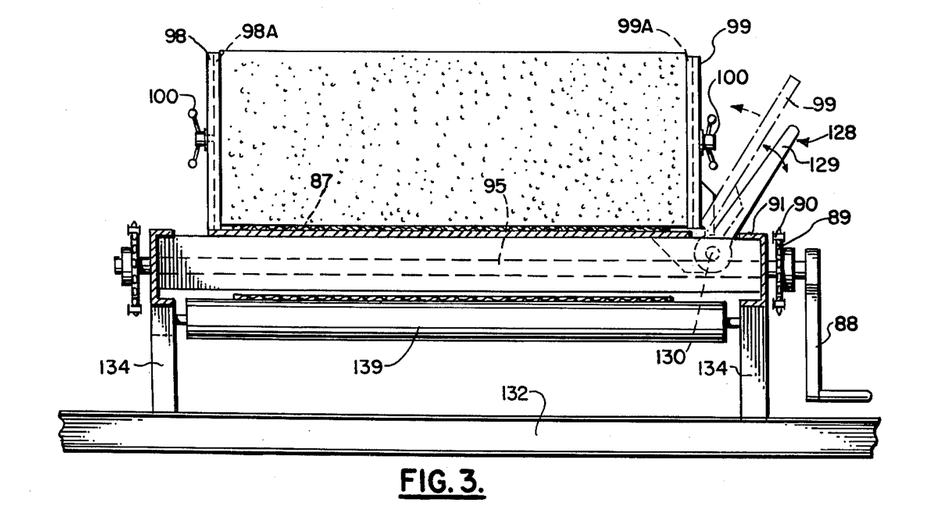
FIG. 3 is another end view taken along lines 2 — 3 of FIG. 1 showing the racheting assembly for fixedly positioning of the block.
Figure 8:
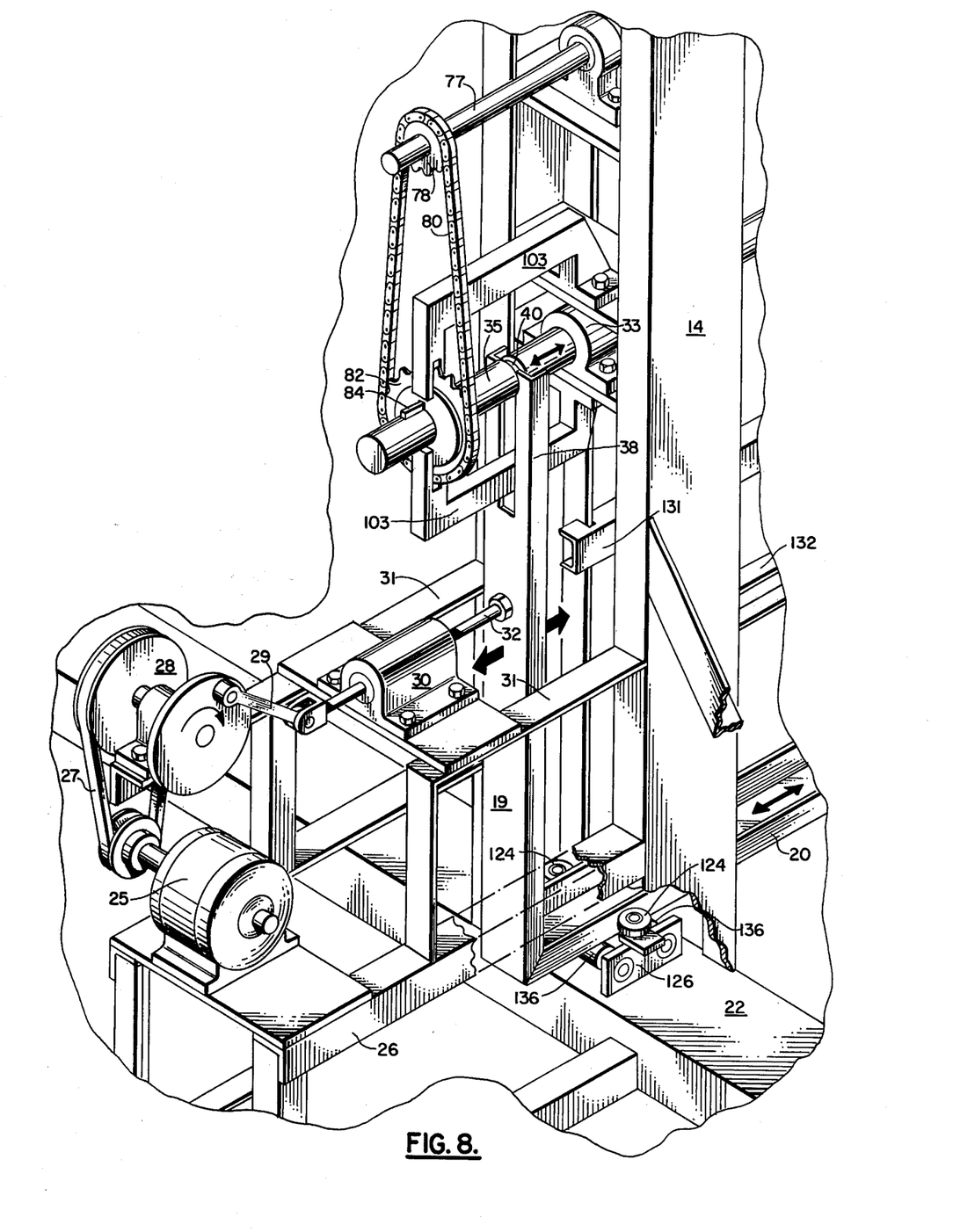
FIG. 8 is a perspective view showing one embodiment of the reciprocating drive means for the reciprocating framework.

Thus far, there has been described a stationary framework comprising the pairs of spaced apart vertical standards 14, one pair for each side of the apparatus to thus present a rectangular framework. As best seen in FIGS. 2 and 8 of the drawings, the movable framework consisting of uprights 18 and 19 and transverse beam 20 are mounted between the said spaced apart vertical standards 14 and means to be described more fully hereinafter effect a travel of the movable framework as shown by the directional arrows in FIGS. 2 and 8 of the drawings.

To assist and guide the movable framework in its reciprocating path are pairs of rollers 136 and 137 mounted on plate members 126, 127 respectively, which in turn are welded to horizontal channel irons 22, 21 respectively. Channel iron 20 rests on these roller guides 124, 125 attached to plate members 126, 127, respectively, are placed in contact with the sides of channel iron 20 on each side as shown best in FIGS. 2 and 8.

Again examining FIGS. 2 and 8, a suitable motor 25 is mounted on supports 26 which are welded or otherwise secured to each of the uprights 14 and suitable bracing extends therefrom to rigidify the mounting. A belt 27 extends from the conventional pulley on the motor 25 and extends to pulley 28 to which is connected an eccentrically mounted pitman arm 29 which extends through a stationary bearing 30. The pulley 28 and bearing 30 are each supported on horizontally extending support plates 31 secured in any known manner on spaced apart vertical uprights 14. The portion of the arm 29 extending through the bearing 30 is pivotally connected in any known manner to upright 19 by means of a horizontal rod 32. Thus, as can be appreciated, rotation of the pulley 28 will cause the eccentrically mounted pitman arm 29 to effect a reciprocating motion to the aforesaid movable frame structure to which the end of horizontal rod 32 is secured.

Fixedly mounted on each of the spaced apart vertically extending standards 14 are stationary brackets 33, 34 through which extend shafts 35, 36 which are designed to reciprocate therein when the movable frame is reciprocated and to also rotate therein in a manner to be described more fully hereinafter.

Referring now particularly to FIG. 8 of the drawings uprights 18 and 19 are each provided with extensions 37, 38 which engage with grooves 39, 40 formed in the shafts 35, 36 so that when the movable framework is caused to reciprocate in the direction shown by the arrows.

Figure 9:
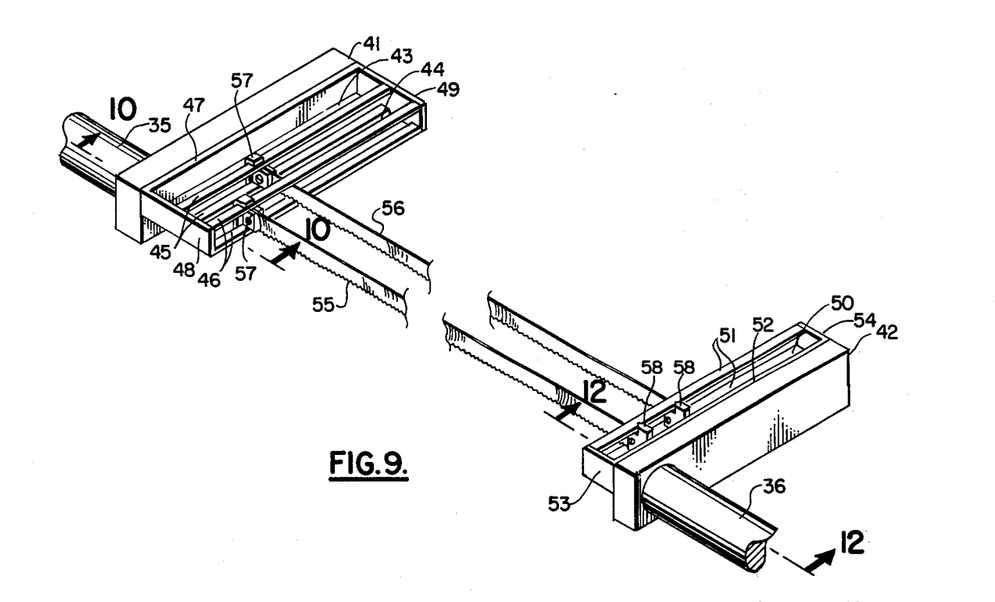
FIG. 9 is a perspective view of the cutting assembly.
Figure 10:
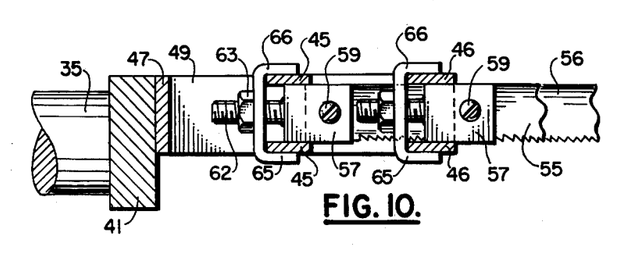
FIGS. 10 – 13 are perspective cutaways of details of the cutting assembly.
Figure 11:
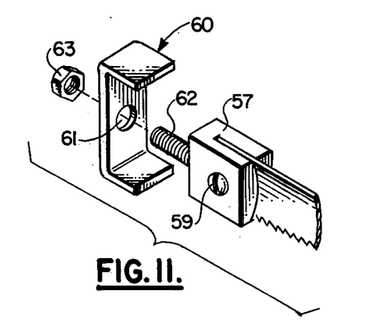
Figure 12:
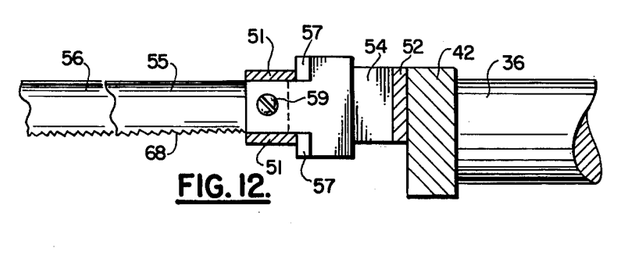
Figure 13:
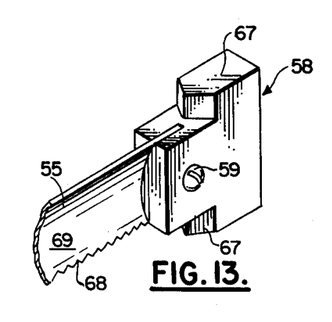

Mounted on and secured off-center to each of the shafts 35, 36 are a pair of saw holding members 41, 42. Member 41 is provided with two slots 43, 44 which are formed by pairs of parallel flat rods 45, 46 and brace 47 held in position by end plates 48, 49. Member 42 is provided with a single slot 50 formed by a pair of parallel flat rods 51 and brace 52 held in position by end plates 53, 54. Saw blades 55 and 56 are each provided with end shoulder pieces 57 and 58 that are attached to blades 55 and 56 by screws 59. Shoulder pieces 57 fit between flat rods 45 and are secured to rods 45 by a U-shaped member 60 having opening 61 through which screw 62 passes and is secured by bolt 63. U-shaped member 60 has base 64 with protruding end plates 65, 66 that extend over flat rods 45 and 46 as shown in FIGS. 9 and 10. Shoulder pieces 58 have raised portions 67 that extend behind and past flat rods 51 to hold blades 55 and 56 securely in position.

In a preferred feature, adjacent blades 55 and 56 will be of differnt lengths so that one shoulder piece 57 fits in slot 43 and the corresponding shoulder piece 57 of the other blade fits in slot 44. In this embodiment, it is possible to secure blades 55 and 56 much closer to one another than if they were both fitted into the same slot.

In another preferred feature blades 55 and 56 will have teeth edges 68 forming a line parallel with the middle of shafts 35, 36. This insures proper alignment of blades 55, 56 for cutting the semi-circular paths through the blocks of insulation material. It is still further preferred that blades 55, 56 have blade surfaces 69 curved to fit in the semi-circular path being cut by the blade; i.e., the degree of curvature will be identical to the degree of curvature of the blade path.

Extending upwardly from vertical standards 14 and secured thereto in any known manner are a pair of spaced apart vertical extension beams 70, 71 constructed of suitable channel irons. Welded or otherwise secured to the extension beams 70, 71 is a support plate 72 on which is mounted a jacking mechanism 73 designed to be actuated by a suitable crank 74 keyed to a shaft 75 extending outwardly of the extension beams 71 through suitable bearings. The jack 73 is of conventional construction and is of the usual screw type. A vertically movable channel iron 76 is mounted for vertical travel between the extension beams 70, 71 when the jack is actuated for a purpose to be set forth more particularly hereinafter.

Mounted for rotation in suitable bearings (not shown) fixed between the aforesaid extension beams 70, 71 is a shaft 77 having a pair of sprockets 78, 79 fixed thereto at either end thereof. A pair of sprocket chains 80, 81 are trained over the aforesaid sprockets 78, 79 and over sprockets 82, 83 which are each splined as at 84, 85 to the outer ends of shafts 35, 36 as shown more clearly in FIG. 8 of the drawings. A hand crank 86 is keyed to shaft 77 so that upon rotation of the crank 86, shaft 77 and through the sprocket and chain connections, aforesaid, shafts 35, 36 are also caused to rotate.

Figure 1:
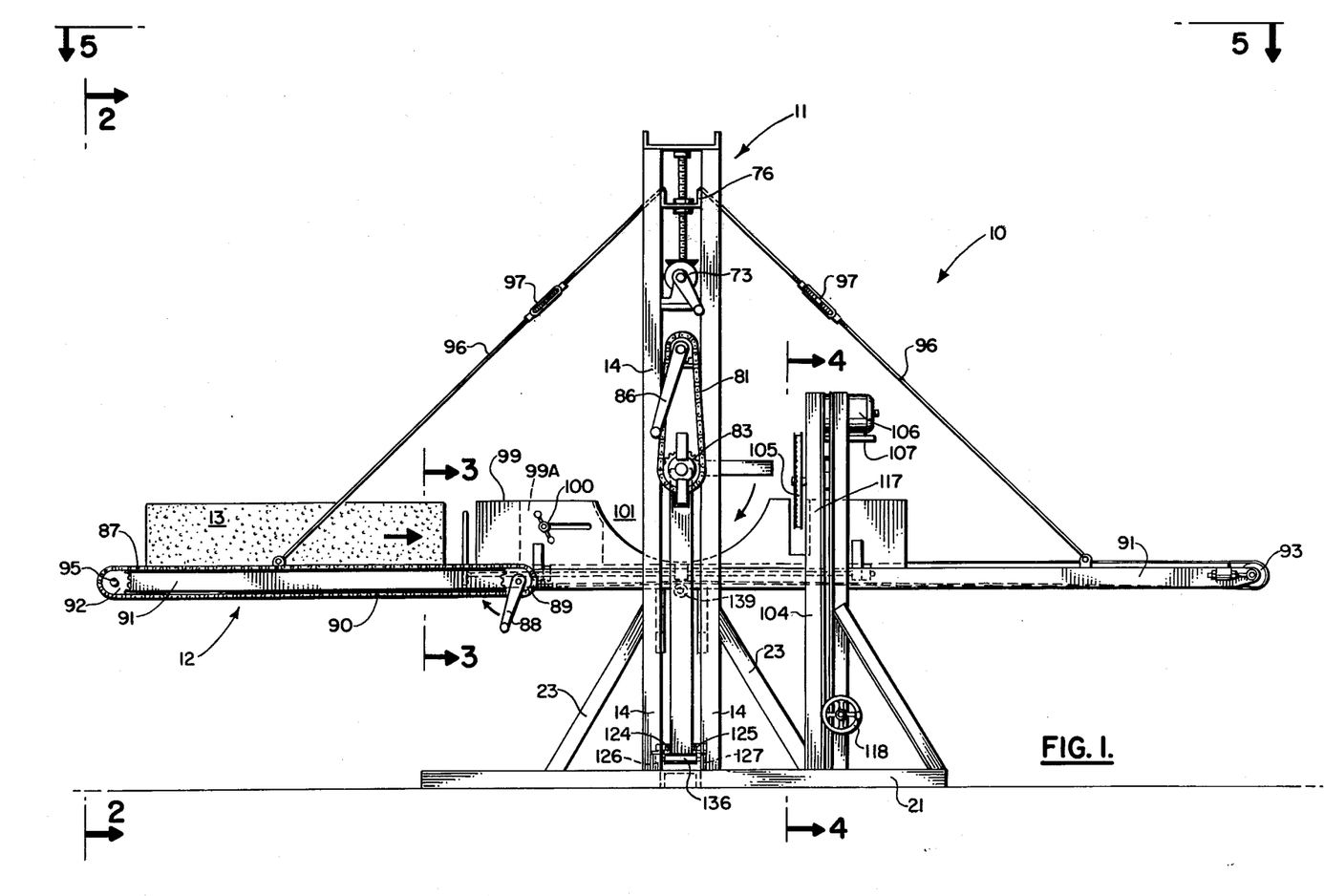
FIG. 1 is a side elevation view showing the block position on the conveyor assembly.
Figure 5:
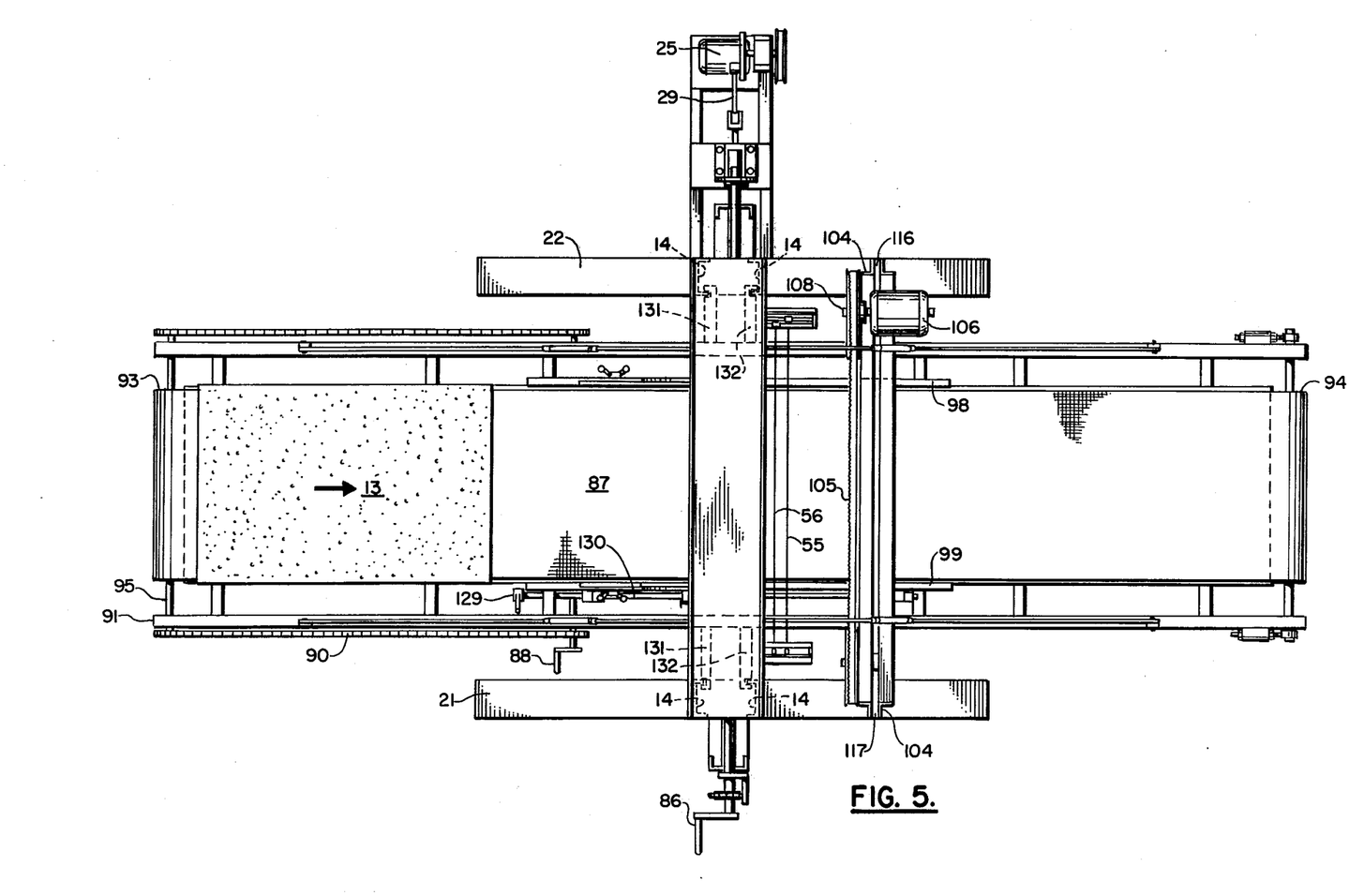
FIG. 5 is a top view taken along lines 5 — 5 of FIG. 1.
Figure 7:
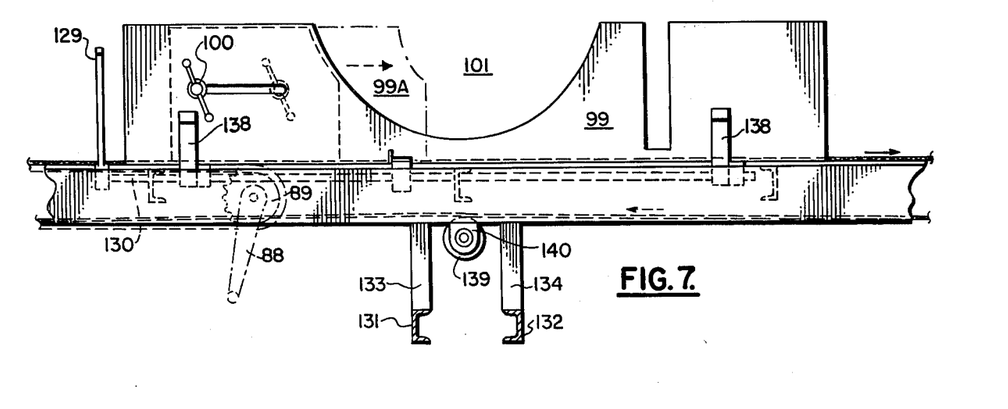
FIG. 7 is a side view taken along lines 7 — 7 of FIG. 6.

Referring now to FIGS. 1, 5 and 7 of the drawings, a block supporting belt 87 is designed to travel in the direction of the arrows and a hand crank 88 engaging a sprocket 89 causes a rotation thereof. A chain 90 is trained over the sprocket 89 mounted for rotation on the horizontal frame structure 91 and leads to a sprocket 92 mounted for rotation at one end of the horizontal framework 91 of the cutting apparatus. Suitable rollers 93, 94 are mounted for rotation in any known manner in framework 91 and the belt 87 is trained to travel thereover when the hand crank 88 is turned. Of course, a shaft 95 is fixed to and extends through roller 93 and is splined to the aforesaid sprocket 92 for rotation therewith. Another roller 139 mounted on bracket 140 positioned under the cutting area also provides support to belt 87.

Figure 6:
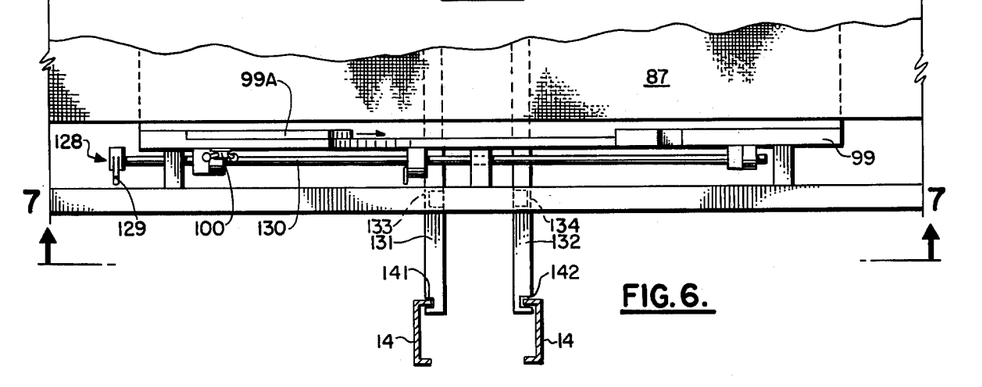
FIG. 6 is a top view showing the racheting assembly.

Referring now more particularly to FIGS. 1 and 2 of the drawings there is shown therein a pair of steel rods 96, each pair of rods secured to the framework 91 and extending over the vertically movable channel iron 76 for supporting the framework and retain the same in a horizontal position. To level the framework 91, the jack 73 may be actuated to elevate or lower the framework through the aforesaid rods 96 or if desired, the turnbuckles 97 may be rotated to either shorten or lengthen the rods 96 to either elevate or lower the framework. To maintain framework 91 in horizontal alignment while making vertical adjustments channel irons 133, 134 (See FIGS. 6 and 7) are welded to framework 91 at one end and to channel irons 131, 132, respectively, at the other end which extend between and engage vertical uprights 14, as shown. Both channel irons 131, 132 are provided with channels 141, 142 respectively, which receive a side plate of uprights 14 for vertical travel. Supported in any known manner to one side of the horizontally extending framework 91 is a fixed plate 98 designed to engage with a block of insulation 13 and to retain the same on the belt 87 during the cutting operation. Cooperating with the said fixed plate 98 and mounted for lateral travel across the belt 87 is an adjustable plate 99 both provided with an adjustment screw 100 positioned on each side of the saw carrying mechanism 41 that tightens slideable members 98A and 99A in position. As best seen in FIGS. 1 and 7 of the drawings, each plate 98A and 99A are provided with an arcuate cut-out 101 formed therein to thus permit for the saw member to travel through a block of insulation in an arcuate path in the formation of the half circle segments therefrom. Thus with a block of insulation material 13 to be cut positioned between the fixed plate 98 and the adjustable plate 99 and secured therebetwen by tightening of the adjustable plate 99 thereagainst, block 13 will be held steady on belt 87 during the cutting operation.

Thus, it will be seen that there has been described an apparatus which is designed primarily to cut arcuate sectionssin the nature of half-circle segments from a block of insulating material. A means has been provided to effect a reciprocating motion of a movable frame structure having mounted thereon and for movement therewith a saw carrying holder which by virtue of the slots provided therein will permit the saws to be spaced from one another to thus define a cut of a desired thickness through the insulation block. While only wo such saws are shown in the drawings, it is obvious as many saws may be mounted in the saw holders as is desired and the same spaced from one another so as to effect a cut of desired thickness of the insulation block shown generally at 13 in FIG. 1 of the drawings.

As stated previously, sprockets 82, 83 are each splined to shafts 35, 36 rotation therewith. However, in order to prevent lateral movement of the sprockets as the shafts 35, 35 are caused to reciprocate during the cutting operation, arms 102, 103 are secured to the stationary brackets 33, 34 and engage with a suitable fixed cage 103 in which the sprockets 82, 83 are mounted. Thus, during the reciprocation of the shafts 35, 36 the cage 103 will retain the sprockets in alignment with their respective sprockets 78, 79 while still permitting for the shafts 35, 36 to reciprocate as described previously.

Extending over the horizontal framework 91 and supported thereover by means of suitable vertical standards 104 fixed to horizontally extending channel irons 21 is a horizontally disposed saw 105 which is in the nature of an endless band saw driven for rotation by a motor 106 mounted on a suitable bracket 107 affixed in any manner to a movable framework to be decided later.

A suitable driving connection 108 extends from the motor 106 to the band saw carrying wheels 109 over which the saw is trained to travel. The wheels 109 are journalled for rotation on standards 104.

Figure 4:
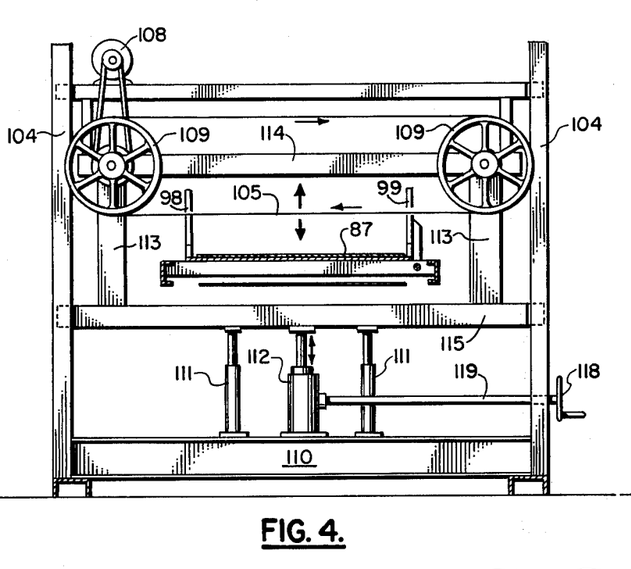
FIG. 4 is an end view taken along lines 4 — 4 of FIG. 1 showing the trimmer saw assembly.

Referring now to FIG. 4 of the drawings, a fixed channel iron 110 is secured in any known manner to vertical standards 104 and mounted thereon are follower jacks 111 and an elevating jack 112 of known construction. A vertically movable framework comprises a pair of vertically extending spaced apart supports 113 are secured in any known manner to a horizontally extending support plate 114 and to a horizontally extending support plate 115. Each plates 114 and 115 are provided at their outer ends with vertically extending extension plates 116, 117 adapted for vertical travel between the spaced apart vertical standards 104 as best seen in FIG. 5 of the drawings. A hand crank 118 is keyed to a shaft 119 to thus cause rotation thereof and through the jack 112, elevate or lower the saw carrying frame 113, 114 and 115 to adjust the position of the saw 105 with respect to the block of insulation material 13 on the belt 87 for a purpose to be more fully described hereinafter.

Operation of the apparatus is as follows:

Having determined the inside diameter of the insulation segment to be cut away from the block of insulating material and also having determined the outside diameter of the segment to be cut, the saw blades in the blade holding assemblies are set apart the required distance to produce the desired diameter and thickness cut and then locked in position in the blade holding assemblies. The block 13 to be cut is shown generally in FIGS. 14, 15 and 16 of the drawings and consists of a generally rectangularly shaped formation of foamed glass or like foamed material indicated generally at 13. The block is supported on the traveling belt 87 and by rotation of the hand crank 88 the block 13 is brought into position beneath the saw assemblies, aforesaid and clamped into position between adjustable plate 99 and stationary plate 98 for the cutting operation by use of a conventional ratchet assembly 128 having a handle 129 connected to pivoting brace 138 attached to adjustable plate 99.

With the block in proper position for the cutting operation, the reciprocating frame 18, 19, 20 is caused to reciprocate by virtue of the motive power 25 and linkage 29, 32 extending therebetween. With the reciprocating frame moving back and forth and with the saw assemblies designed to move along therewith, the saws with contact the upper portion of the block and then upon rotation of the hand crank 86, the saw carrying members are caused to travel downwardly into an arcuate path and in it's downward travel, a segment of the block will be cut away from the block. Following the downward travel of the saws the same will now travel in an upward direction, again cutting an arcuate section from the block.

Depending on the spacing of the saws on the saw assemblies, aforesaid, the cut segments will be of known internal diameter to fit outside a pipe of a given external diameter and the thickness of the segment will also have been determined before the cutting operation.

Figure 14:
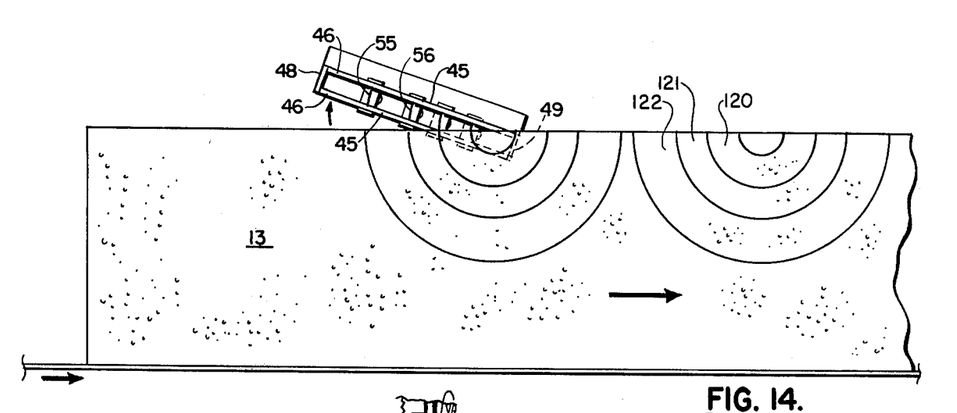
FIGS. 14 – 16 illustrate the different cutting steps used with this invention.
Figure 15:
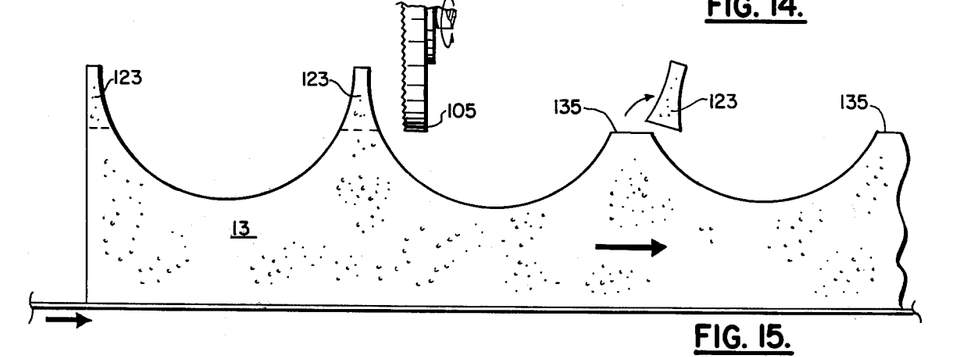
Figure 16:
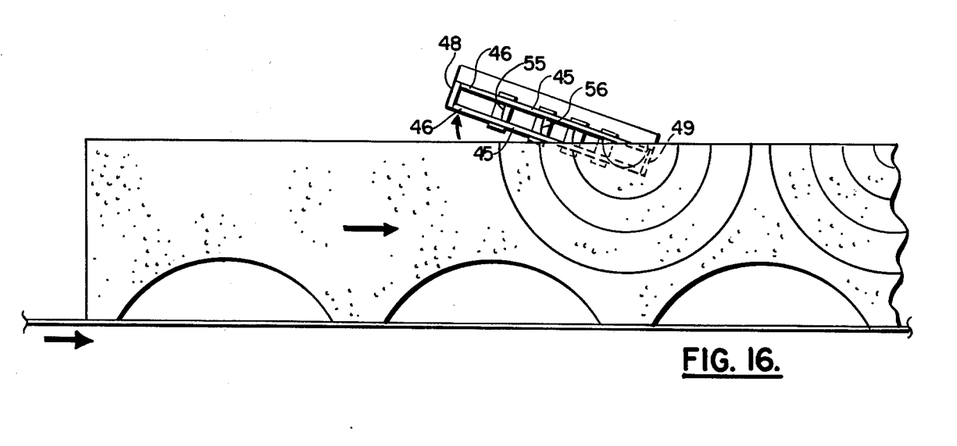

Shown in FIGs. 14, 15 and 16 of the drawings are end views of the block 13 made of formed glass or like formed material and such blocks are of rectangular shape and of sufficient thickness to provide half-circle segments therefrom when cut by the saws 50 to provide segments adapted to be applied to the exterior of a conduit and when a suitably clamped thereon provide a proper insulation for the conduit. It should be pointed out that from each block of insulation material and following the cutting operation to produce segments from a one-half portion of the block. Such segments are shown generally at 120, 121 and 122. Following the cutting away, the aforesaid segments there is formed a peak area 123 extending between the cut portions and in order to provide a supporting surface for the block from which the segments have been removed, the peaks 123 are removed by the horizontally extending saw 105 which will produce flat surfaces 135 which will support the block on the belt for the removal of the segments from the other half portion of the block.

Although I have herein shown and described my invention in what I have conceived to be the most practical and preferred embodiment, it is recognized that departure may be made therefrom within the scope of my invention.

What I claim is:

1. An apparatus for cutting semi-circular segments of foamed glass or like insulation material from a block of foamed glass or like insulation material, said apparatus comprising a stationary vertically extending framework including pairs of spaced apart supports, a conveyor belt assembly having a conveyor belt traveling between said pairs of spaced apart supports for supporting a block thereon, a rigid reciprocating framework mounted for movement between said pairs of spaced apart supports, parallel saw carrying elements mounted above and on each side of said block for simultaneous, some directional movement with said reciprocating framework, two or more rigid, straight saw blades adjustably parallelly mounted between said saw carrying elements, wherein one of said saw carrying elements comprises pairs of parallel rods and a brace member adjacent one of said rods, said rods and said brace perpendicularly attached to end plates to form a slot between said rods and a second slot between said brace and said adjacent slot, and said saw blades each having one end mounted in a different slot then said other blade, and means for rotating said saw carrying elements to cut semi-circular segments from said stationary block of insulation material when said reciprocating framework is reciprocated.

2. The structure recited in claim 1 wherein said conveyor belt assembly is vertically adjustable by a jacking means attached to said stationary framework.

3. The structure recited in claim 1 wherein said conveyor belt assembly comprises plate members positioned adjacent said conveyor belt and extending vertically upward between said conveyor belt, one of said plate members being vertically adjustable, said plates having arcuate cutout for said saw blades to travel.

* * * * *